US006168438B1

(12) United States Patent
Leonard et al.

(10) Patent No.: US 6,168,438 B1
(45) Date of Patent: Jan. 2, 2001

(54) METHOD OF CREATING VIVID PAINTINGS USING CLEAR CANVAS

(76) Inventors: Suzanne A. Leonard, 819 Cumberland, St. Louis, MO (US) 63125; Wendy Dyer, #22 Chesterton La., Chesterfield, MO (US) 63017

( * ) Notice: Under 35 U.S.C. 154(b), the term of this patent shall be extended for 0 days.

(21) Appl. No.: 09/324,297

(22) Filed: Jun. 2, 1999

(51) Int. Cl.[7] .................................................. G09B 11/00
(52) U.S. Cl. ................................. 434/81; 434/84; 434/88
(58) Field of Search ................................. 434/81, 82, 84, 434/85, 88, 89, 91, 92

(56) References Cited

U.S. PATENT DOCUMENTS

| | | | |
|---|---|---|---|
| 2,371,153 | * 3/1945 | Connelly | 283/46 |
| 2,517,664 | 8/1950 | Hill | 35/28 |
| 2,681,527 | * 6/1954 | Sundt | 283/46 |
| 2,954,615 | 10/1960 | Brown | 35/26 |
| 3,447,250 | 6/1969 | Savage | 35/26 |
| 3,581,882 | * 6/1971 | Bish | 434/81 |
| 3,587,179 | * 6/1971 | Oeswein | 434/81 |
| 4,940,153 | * 7/1990 | Pilgrim, Jr. | 215/12.2 |
| 5,382,233 | * 1/1995 | Brotz | 604/88 |
| 5,418,024 | 5/1995 | Inashvili | 428/38 |
| 5,447,488 | * 9/1995 | Horikiri | 493/344 |
| 5,788,501 | * 8/1998 | Hassall | 434/84 |

* cited by examiner

*Primary Examiner*—Sam Rimell
*Assistant Examiner*—Bena B. Miller
(74) *Attorney, Agent, or Firm*—Womble Carlyle Sandridge & Rice, PLLC

(57) ABSTRACT

A method of creating vivid life-like paintings using a clear or translucent canvas is provided. The method includes placing the canvas atop an image to be reproduced and tracing outline and highlight colors from the image onto the front side of the canvas. The canvas is then turned over and field colors and background colors are applied to the back side of the canvas. As a final step, a clear coating can be applied to the front side of the canvas. The result is a surprisingly vivid and life-like rendering of the image when the canvas is viewed from its front side. The rendering results from the combination of outlines and highlights on the front of the canvas and field and background colors visible through the canvas from the back side thereof, all enhanced by the clear coating.

11 Claims, 2 Drawing Sheets

METHOD OF CREATING VIVID PAINTINGS
USING CLEAR CANVAS

TECHNICAL FIELD

This invention relates generally to artistic paintings and more particularly to painting techniques for reproducing a selected image in acrylics or oils on a clear or translucent canvas.

BACKGROUND

Painting is an age-old art form dating from at least as early and man's cave dwelling ancestors to the paintings of the middle ages, to modern renderings. Historically, high quality paintings acceptable for framing and display have been the domain of professionally trained fine artists who develop their skill and talent after years of study and practice. This is particularly true of certain types of paintings and techniques of painting, such as portrait painting, which generally require exceptional artistic skill and experience. Although many less experienced artists and even novices or craftspeople would like to produce high quality paintings and portraits suitable for display, many are often frustrated by the results they are able to obtain using traditional painting techniques.

Attempts have been made in the past to provide various guides and tools that can be used by novice artists to create high quality paintings. One well known method is the classic "paint-by-numbers" system wherein outlines of various portions of a scene are printed on a canvas with numbers printed in each outlined portion. Paints are provided with colors corresponding to the numbers and the painter applies the appropriate paints within the outlined portions to produce a finished painting. While millions for relaxation and entertainment over the years have used the paint-by-numbers technique, it nevertheless tends to produce paintings that lack the vivid natural qualities of paintings produced by professional artists. In fact, paintings produced with the paint-by-numbers system generally are very recognizable as such and usually are not considered to be of a quality and character suitable for framing and display. Further, when using the paint-by-numbers system, an artist is strictly limited to specific scenes that are provided by the makers of the painting kits and are thus unable to create unique paintings or portraits of family members or friends. Thus, paint-by-numbers techniques are at best a crude attempt to allow a novice to produce high quality paintings.

Most novices are more comfortable when they are able to trace a scene or portrait they wish to paint. In addition, tracing allows one to recreate familiar or favorite scenes and even portraits and thus overcomes some of the limitations of the paint-by-numbers technique. The tracing process can also provide valuable training and instruction to the novice artist. Painting techniques that take advantage of these facts have been made available in the past. U.S. Pat. No. 5,382,233, for example, discloses a method of art instruction wherein a clear sheet of plastic is adhered to a television screen. An image is projected on the screen and a student paints over or copies the image as seen through the clear plastic sheet. The sheet is then removed and the painted image is transferred to a canvas or other sheet material for mounting and display. While this technique is intriguing, it nevertheless is fraught with problems and shortcomings. For example, an expensive television screen and a VCR or other source of images is required. The inaccuracy of color reproduction by a television is also a problem as is the transfer technique itself, which can require special heat transferable paints and can produce results that lack the vivid finished quality of fine artwork.

U.S. Pat. No. 2,517,664 of Hill discloses an educational drawing device wherein pre-printed drawings are traced onto a sheet of tracing paper in stages of complexity to provide instruction and training in drawing techniques. In a similar vein, U.S. Pat. No. 3,447,250 of Van Savage discloses a painting guide kit wherein a clear sheet of material is placed on successive portions of a scene printed in reverse or mirror image form. The sheet is first placed on portions of the scene representing foreground images and these portions are painted. Next, the sheet is placed on portions representing intermediate objects and finally on portions representing background objects, and each portion is painted in turn. When painting is complete, the finished image is revealed when the sheet is viewed from its front side. The techniques of these patents, while interesting, still require specialized preprinted guides and drawings and are thus limited to specific scenes. Further, the finished painting also lacks the natural vivid quality of fine artwork.

Thus, a need exists for a painting method that will allow the novice painter to produce vivid life-like professional looking paintings, that is not limited to specific preprinted guides or scenes, that will allow the painter to reproduce familiar scenes and portraits of loved ones and friends, and that is easy to use by almost anyone wishing to indulge in the art of painting. It is to the provision of such a painting method and technique that the present invention is primarily directed.

SUMMARY OF THE INVENTION

Briefly described, the present invention, in one preferred embodiment thereof, comprises a method of creating vivid life-like paintings using a clear or translucent canvas having front and back sides. The method comprises the steps of overlaying the canvas atop an image such as a still life, landscape, or portrait to be reproduced on the canvas with the front side of the canvas exposed and with the image visible through the canvas. Preselected outlines in the image are then traced onto the front side of the canvas to define the basic shapes of the painting. Next, preselected portions of the image, preferably individual highlights, shading, or foreground elements are painted onto the front side of the canvas with the colors of the image providing a guide to the selection of colors painted onto the canvas. The canvas is then removed from the image and turned over so that its back side is exposed. Broad field and background colors are painted onto the back side of the canvas using the previously traced outlines, which are visible through the canvas, as a guide. Preferably, field colors, that is the colors of objects in the image, are painted first followed by background colors and successive colors are painted onto previously applied colors without the need for great care in delineating borders between the two. Finally, the painted canvas is turned back over and a clear coating is applied to the front side of the canvas to enhance the appearance of the painted image and to simulate texture and brush strokes in the painting. When dry, the finished painting is viewed from the front of the canvas. The result is a surprisingly vivid and life-like painting with the background and field colors, somewhat muted by the clear or translucent canvas, visible through the canvas and with the highlights, shadows, and foreground objects clearly visible on the front of the canvas. The painting can then be framed or otherwise mounted and displayed in the usual way.

Thus, an improved method of creating vivid paintings is now provided that successfully addresses the problems and shortcomings of the prior art. Specifically, with the method of this invention, a novice or craftsperson can recreate in paint any image that is desired without the need for special guides or pre-printed images. The method is therefore especially suited to creating portraits from photographs and the result is a correctly proportioned, life-like, and surprising vivid reproduction suitable for framing and display. The invention also contemplates a painting kit provided with one or more clear canvases and a selection of paints specifically chosen for particular subjects such as landscapes, portraits, and still life renderings.

It is therefore an object of the invention to provide a method of creating vivid paintings that can be practiced by amateur or novice painters with results more akin to the work of experienced professional artists.

It is another object of the invention to provide a technique of reproducing images that does not require specialized guides or pre-printed images.

Another object of the invention is to provide a novel new painting technique that results in surprisingly vivid paintings with the minimum time and skill.

A further object of the invention is to provide a painting kit usable by amateur artists to create vivid life-like reproductions suitable for display.

These and other objects, features, and advantages of the invention will become more apparent upon review of the detailed description set forth below when taken in conjunction with the accompanying drawing figures, which are briefly described as follows.

DETAILED DESCRIPTION OF THE PREFERRED EMBODIMENT

Figure 1:
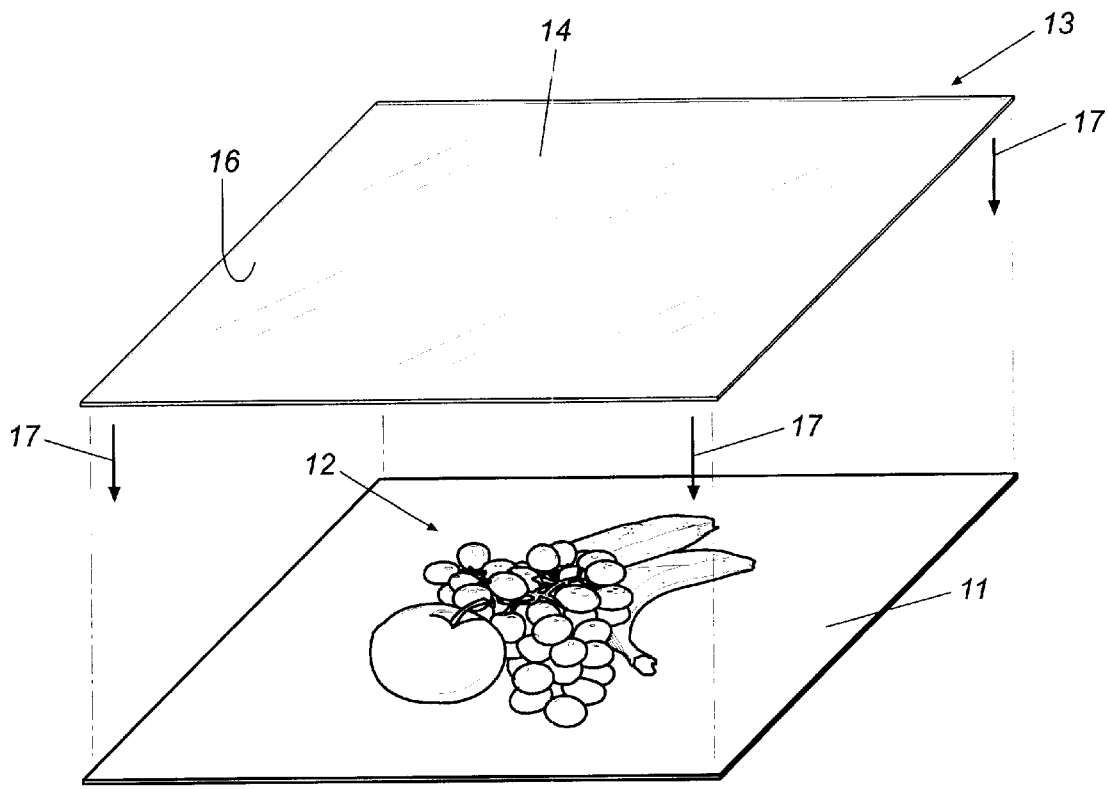
FIG. 1 is an exploded perspective view illustrating the overlaying of a clear canvas atop an image to be reproduced according to a preferred embodiment of the invention.

Referring now in more detail to the drawings, in which like numerals refer to like parts throughout the several views, FIGS. 1 through 4 illustrate the various steps of the painting technique according to a preferred embodiment of the invention. FIG. 1 illustrates a sheet or template 11 bearing an image 12 to be reproduced and rendered as a painting according to the invention. The image 12 is a simple still life in the drawings of FIGS. 1 through 4; however, it will be understood that the image could be virtually any image that the artist wishes to reproduce. For example, the image could be a landscape, seascape, or a portrait and could take the form of photograph, a picture from a magazine, a specially prepared image, or another painting. In fact, the present invention is particularly effective when reproducing portraits because it results in a correctly proportioned rendering and the vivid life-like results are particularly suited to portraits.

A sheet of clear canvas 13 has a front side 14 and a back side 16. The canvas 13 can be fabricated of a variety of materials including glass, acetate, or styrene and can be clear or, preferably, slightly translucent. It has been found that a slightly translucent canvas enhances the vivid appearance of the final painting because of its subtle diffusing of paints applied to the back side 16 of the canvas when viewed from the front side 14. It has also been found that a canvas that is textured at least on the front side and preferably on the front and back sides is preferable because the texture holds paint better and simulates the appearance of a cloth canvas. In this regard, textured translucent plastic sheets known as stencil blanks or leading blanks available from most craft shops have been found to perform well when used in the method of this invention.

In the first step of the method, the clear canvas 13 is overlayed atop the template 11 bearing the image 12 as indicated by the arrows 17 in FIG. 1 with its front side 14 exposed. When the two are overlayed, the image 12 is visible through the clear canvas.

Figure 2:
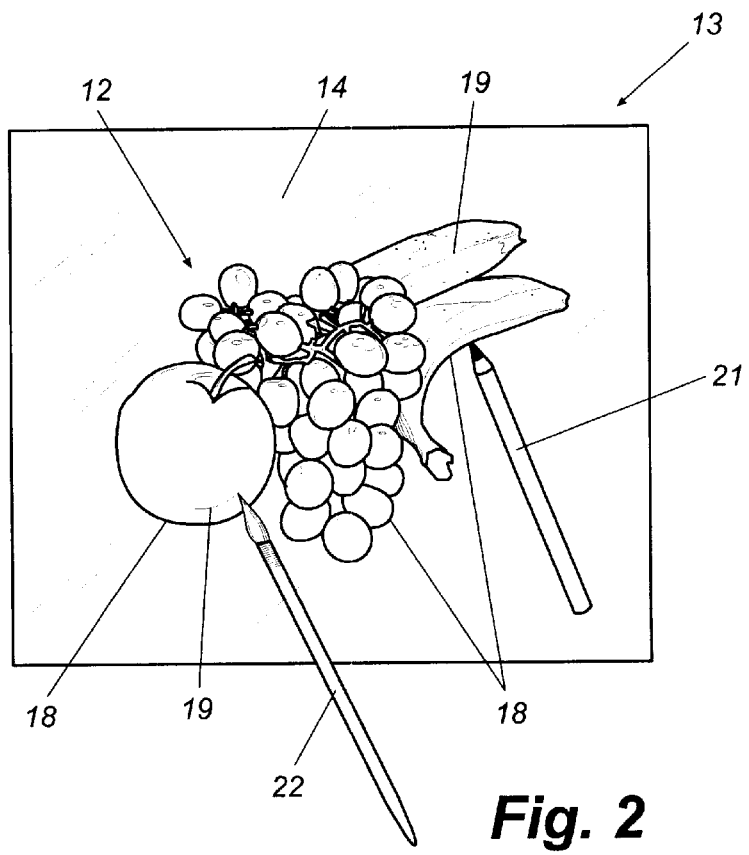
FIG. 2 illustrates the reproduction of outlines, highlights, and shading on the front of the clear canvas using the underlying image as a guide.

Referring to FIG. 2, with the canvas overlayed on the image, preselected portions of the image are traced and reproduced on the front side 14 of the clear canvas 13. Generally, the portions reproduced on the front side 14 will be outlines 18 of key elements of the image, which can be traced with an outlining pen 21, as well as highlights and shading features 19, which are painted onto the canvas 13 with a highlighting brush 22. In each case, the underlying image serves as a guide to the position and proportions of the various elements of the painting and to the selection of paint colors to match the shading and highlight colors in the image.

In one embodiment, it is anticipated that the invention will be supplied in kit form with the kit including clear canvases and a selection of paint colors designed for a particular subject. For example, a portrait kit will include colors for skin tones and shading while a landscape kit will include colors selected to be appropriate for the elements of a landscape such as, for example, vegetation and sky. Preprepared images might also be supplied, although the present invention is particularly suited to reproduction of any images or portraits that the artist wishes to reproduce.

Figure 3:
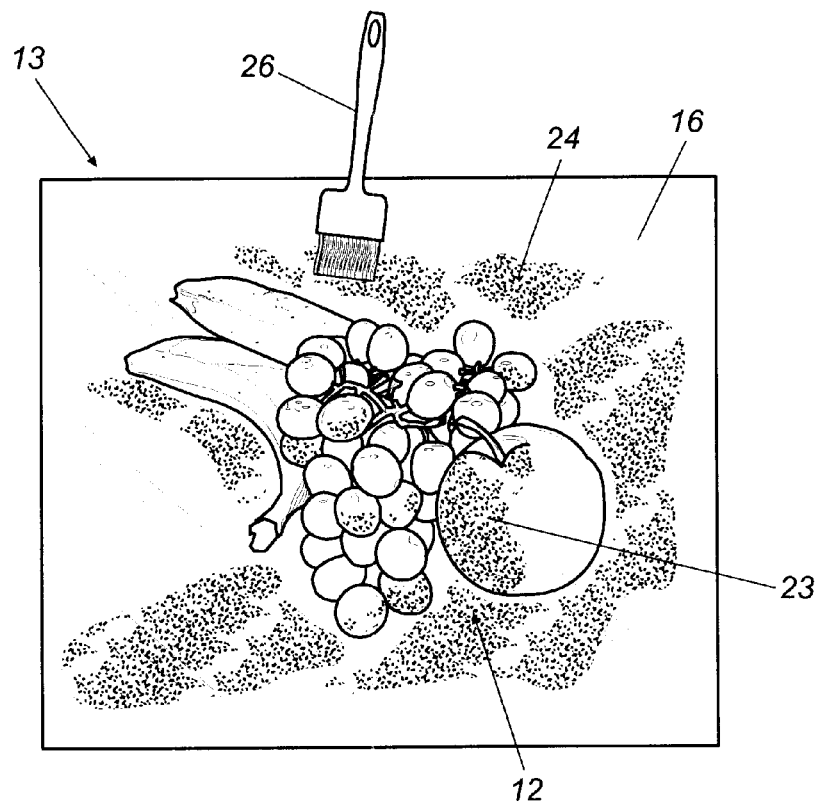
FIG. 3 illustrates application of broad field and background colors to the back of the canvas after selected portions of the image have been reproduced on the front of the canvas.

Referring to FIG. 3, after the outlines, highlights, and shading have been applied to the front side 14 of the canvas 13, the canvas is removed from the image and turned over to expose its back side 16. When so turned, the outlines, highlights, and shading previously applied to the front side of the canvas are clearly visible from the back side 16 through the canvas 13. Using the outlines as a guide, field colors 23 and background colors 24 are next applied to the back side 16 of the canvas using an appropriate field and background brush 26. Although these colors may be applied in any desired order, it has been found effective to apply the field colors, that is the colors defining the various elements of the painting, first followed by the background colors. One aspect of the invention is that extreme skill is not required when applying the field and background colors and one may overlap the other. Thus, the technique of this invention is particularly suited for use by novice or amateur painters who have yet to develop the skill and control of a fine artist.

It should be understood that application of field and background colors may be done in slightly different ways depending on the subject matter of the image being produced. In landscapes, for example, foreground objects are generally filled in first followed by objects in intermediate planes and finally by the background. In a portrait, skin colors and hair might be applied first followed by the background. Many other variations are possible according to the subject matter and desired end effect and any variation of application order and technique should be considered to be within the scope of this invention.

Figure 4:
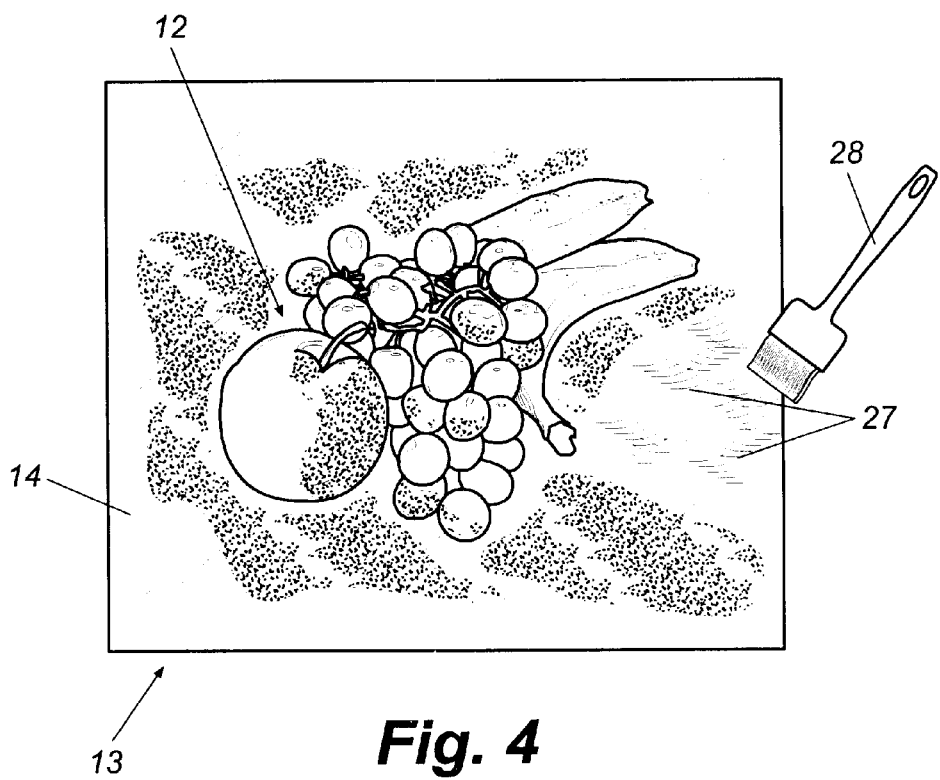
FIG. 4 illustrates the final step of applying a clear coating to the front of the canvas to simulate brush strokes and give the painting a finished look.

With the background and field colors applied, the clear canvas is again turned over, as illustrated in FIG. 4, to expose its front side. A clear coating of acrylic or other appropriate coating is then applied with a brush 28 to the front side 14, preferably covering the entire front surface including the previously applied outlines and highlights. The clear coating has been found to provide at least two advantages. First, it enhances and deepens the colors applied to the canvas to provide a more vivid result and, second, the clear coating simulates brush strokes, particularly when applied in a random changing pattern, further enhancing the oil-on-canvas look of the finished painting. In addition, the clear coating acts as a finishing agent to protect the paint on the front side of the canvas. Alternatively, the clear coating may be omitted in cases where its effects are not desired by the artist. The painting can then be framed or otherwise mounted and displayed.

With the clear coating applied, the method of the invention is complete. The finished painting, when viewed from the front side of the canvas, has a surprisingly vivid, natural, and life-like appearance and is correctly colored, shaded, and proportioned because the original image provided a guide to the artist in each instance. Most significantly, creation of the painting does not require the skill and talent of a fine artist but nevertheless produces results that approaches the work of a fine artist. A novice or amateur painter, using the technique of this invention, is therefore encouraged and can be proud of the finished painting.

The invention has been described herein in terms of preferred embodiments and methodologies. It will be obvious to those of skill in the art, however, that various modifications to the illustrated technique are possible within the scope of the invention. For example, while the technique is well suited to creating the appearance of an oil-on-canvas painting, it can also be used to reproduce painted images on thin clear material that can be wrapped or applied to objects such as plates, cups, or jewelry boxes. Further, while acrylic paints have been found to work well with the technique, other types of paints are also possible such as, for example, oils, grease paints, or watercolors. In fact, it might be desired to reproduce black and white images, in which case only outlines and shades of gray rather than colors might be used. The technique can also be used to produce vivid life-like reproductions of intricate stained glass windows when leaded dividers are applied to the front of the clear canvas and the colors of the glass are applied to the back side. Backlighting the finished rendering can enhance this effect. These and many other additions, deletions, and modifications might well be implemented by those of skill in the art without departing from the spirit and scope of the invention as set forth in the claims.

What is claimed is:

1. A method of creating vivid paintings using a clear canvas having front and back sides, said method comprising the steps of:
   (a) providing a clear canvas and placing the clear canvas atop an image to be reproduced on the canvas with the front side of the canvas exposed, the image being visible through the clear canvas;
   (b) tracing preselected portions of the image onto the front side of the clear canvas;
   (c) removing the canvas from the image;
   (d) turning the canvas over to expose the back side of the canvas, the traced preselected portions of the image on the front side of the canvas being visible through the clear canvas;
   (e) applying paint to the back side of the canvas in at least a portion of the image; and
   (f) turning the canvas over to expose the front side of the canvas, the paint on the back side of the clear canvas being visible through the canvas, the combination of tracings on the front side of the canvas and the paint visible through the canvas from the back side of the canvas creating a vivid painted reproduction of the image.

2. A method of creating vivid paintings using a clear canvas as claimed in claim 1 and wherein step (b) comprises tracing the outlines of the image onto the front side of the canvas.

3. A method of creating vivid paintings using a clear canvas as claimed in claim 2 and wherein step (b) further comprises painting selected highlights from the image onto the front side of the canvas.

4. A method of creating vivid paintings using a clear canvas as claimed in claim 3 and wherein step (b) further comprises painting selected shadows from the image onto the front side of the canvas.

5. A method of creating vivid paintings using a clear canvas as claimed in claim 4 and wherein step (e) comprises applying field colors to the back side of the canvas.

6. A method of creating vivid paintings using a clear canvas as claimed in claim 5 and wherein step (e) further comprises applying background colors to the back side of the canvas.

7. A method of creating vivid paintings using a clear canvas as claimed in claim 1 and further comprising the step (g) of applying a clear coating to the front side of the canvas to simulate brush strokes and enhance the appearance of the painting.

8. A process of reproducing an image comprising the steps of:
   (a) providing a canvas that is at least partially transparent and that has a front side and a back side;
   (b) placing the canvas atop an image to be rendered on the canvas with the front side of the canvas exposed, the image being visible through the canvas;
   (c) tracing preselected portions of the image onto the front side of the canvas;
   (d) turning the canvas over to expose the back side of the canvas; and
   (e) painting other portions of the image onto the back side of the canvas, the canvas, when viewed from the front side thereof, conveying a completed image made up of portions of the image on the front side of the canvas and other portions of the image visible through the canvas from the back side thereof.

9. The process of claim 8 and wherein step (a) the canvas has at least one side that is textured.

10. The process of claim 9 and further including applying a clear coating to the front side of the canvas to enhance the appearance of the image.

11. The process of claim 10 and wherein the portions of the image traced on the front side of the canvas include outlines of the image and highlights on the image and wherein the other portions of the image on the back side of the canvas include field colors and background colors of the image.

* * * * *